United States Patent
Kano

(10) Patent No.: US 11,604,170 B2
(45) Date of Patent: Mar. 14, 2023

(54) INSPECTION DEVICE AND INSPECTION LEARNING MODEL GENERATION DEVICE

(71) Applicant: JTEKT CORPORATION, Osaka (JP)

(72) Inventor: Masaaki Kano, Obu (JP)

(73) Assignee: JTEKT CORPORATION, Kariya (JP)

( * ) Notice: Subject to any disclaimer, the term of this patent is extended or adjusted under 35 U.S.C. 154(b) by 451 days.

(21) Appl. No.: 16/752,738

(22) Filed: Jan. 27, 2020

(65) Prior Publication Data

US 2020/0249206 A1  Aug. 6, 2020

(30) Foreign Application Priority Data

Feb. 4, 2019  (JP) .............................. JP2019-018311

(51) Int. Cl.
*G01N 29/12* (2006.01)
*G01N 29/46* (2006.01)
(Continued)

(52) U.S. Cl.
CPC ........... *G01N 29/12* (2013.01); *B62D 5/0481* (2013.01); *G01M 17/06* (2013.01); *G01N 29/46* (2013.01); *G01N 29/48* (2013.01); *G06N 20/00* (2019.01)

(58) Field of Classification Search
CPC ........ G01N 29/12; G01N 29/46; G01N 29/48; G01N 29/14; G01N 29/14472;
(Continued)

(56) References Cited

U.S. PATENT DOCUMENTS

2017/0241422 A1   8/2017  Munk et al.
2018/0011065 A1   1/2018  Bowers, III et al.
(Continued)

FOREIGN PATENT DOCUMENTS

CN   108205016 A    6/2018
CN   108830127 A   11/2018
(Continued)

OTHER PUBLICATIONS

Zheng et al., Lane-Change Detection From Steering Signal Using Spectral Segmentation and Learning-Based Classification, Mar. 2017, IEEE Transactions on Intelligent Vehicles, vol. 2, No. 1, pp. 14-24 (Year: 2017).*

(Continued)

*Primary Examiner* — Toan M Le
(74) *Attorney, Agent, or Firm* — Oblon, McClelland, Maier & Neustadt, L.L.P.

(57) ABSTRACT

An inspection device includes a first data storage unit configured to store a first data which is time series according to a state of an inspection object, a second data generation unit configured to generate second data, which is a spectrogram including a first frequency component, a time component, and an amplitude component by performing short-time Fourier transform on the first data, a third data generation unit configured to generate third data including the first frequency component, a second frequency component, and the amplitude component by performing Fourier transform on time-amplitude data for each first frequency component in the second data, respectively, and a determination unit configured to determine the state of the inspection object based on the third data.

16 Claims, 13 Drawing Sheets

(51) Int. Cl.
*G06N 20/00* (2019.01)
*B62D 5/04* (2006.01)
*G01M 17/06* (2006.01)
*G01N 29/48* (2006.01)

(58) Field of Classification Search
CPC ...... G01N 2291/0258; G01N 29/4472; G01M 17/06; G06N 20/00; B62D 5/0481; G01H 3/10; G01H 1/10; G01H 1/16; G01H 17/00; G06K 9/00523
See application file for complete search history.

(56) References Cited

U.S. PATENT DOCUMENTS

| | | |
|---|---|---|
| 2018/0120264 A1 | 5/2018 | Sato et al. |
| 2018/0249018 A1 | 8/2018 | Udaka |
| 2018/0284741 A1 | 10/2018 | Cella et al. |

FOREIGN PATENT DOCUMENTS

| | | |
|---|---|---|
| EP | 1 816 451 A2 | 8/2007 |
| JP | S59-109831 A | 6/1984 |
| JP | H11-108806 A | 4/1999 |
| JP | H11-212637 A | 8/1999 |
| JP | 2006-153729 A | 6/2006 |
| JP | 2017-122665 A | 7/2017 |
| JP | 2018-036269 A | 3/2018 |
| JP | 2018-049355 A | 3/2018 |
| JP | 2018-147172 A | 9/2018 |
| WO | 2018/150616 A1 | 8/2018 |
| WO | 2018/168873 A1 | 9/2018 |

OTHER PUBLICATIONS

Extended European Search Report dated Oct. 22, 2020 in Patent Application No. 20154611.6, 13 pages.
F. W. Margrave, et al., "The Use of Neural Networks in Ultrasonic Flaw Detection" Measurement, Institute of Measurement and Control, vol. 25, No. 2, XP004158745, Mar. 1, 1999, pp. 143-154.
European Office Action dated Jul. 27, 2022 in European Patent Application No. 20154611.6, 6 pages.
Office Action dated Nov. 1, 2022 in corresponding Japanese Patent Application No. 2019-018311, along with an English translation.

* cited by examiner

INSPECTION DEVICE AND INSPECTION LEARNING MODEL GENERATION DEVICE

CROSS REFERENCE TO RELATED APPLICATIONS

This application claims priority from Japanese Patent Application No. 2019-018311 filed on Feb. 4, 2019, the entire contents of which are incorporated herein by reference.

BACKGROUND OF THE INVENTION

Field of the Invention

The present invention relates to an inspection device and an inspection learning model generation device.

Description of Related Art

Patent Literature 1 discloses a technique in which a microphone (a sound sensor) or an acceleration sensor is attached to an electric power steering device (an electric steering device) such that an abnormal sound generated from a component of the electric power steering device is detected by the microphone or the acceleration sensor in inspection of the electric power steering device. Patent Literature 2 discloses a technique of detecting an abnormal noise (a rattling sound) generated from a steering system (an electric steering device), when a vehicle is driven, by a microphone in an evaluation device (an inspection device) of the steering system. Patent Literature 2 discloses spectrogram data of an audio signal detected by the microphone.
[Patent Literature 1] JP-A-2006-153729
[Patent Literature 2] JP-A-2018-36269

A detection signal obtained from the acceleration sensor or the sound sensor is time series data. A timing at which the abnormal sound is generated is not uniform in the time series data, so that a timing at which a feature amount necessary for the inspection using the obtained detection signal appears is also random. On the other hand, in the inspection of the electric steering device, a difference in the timing at which the abnormal sound is generated does not affect presence or absence of an abnormality hidden in an inspection target. However, when the inspection is performed by the inspection device using the time series data, the randomness of the timing at which the abnormal sound is generated may adversely affect an inspection result.

For example, when an inspection learning model is generated by a machine learning algorithm with learning data using the obtained detection signal as it is, the generated inspection learning model is affected by the randomness of a time component at which the feature amount appears, so that good learning cannot be performed. As a result, even if the inspection is performed using the inspection learning model, sufficient inspection accuracy cannot be obtained.

SUMMARY

One or more embodiments provides an inspection device and an inspection learning model generation device that can obtain an inspection result in which an influence of a difference in time components is eliminated when performing an inspection using time series data.

In an aspect (1), one or more embodiments provide an inspection device including a first data storage unit configured to store a first data which is time series according to a state of an inspection object, a second data generation unit configured to generate second data, which is a spectrogram including a first frequency component, a time component, and an amplitude component by performing short-time Fourier transform on the first data, a third data generation unit configured to generate third data including the first frequency component, a second frequency component, and the amplitude component by performing Fourier transform on time-amplitude data for each first frequency component in the second data, respectively, and a determination unit configured to determine the state of the inspection object based on the third data.

According to the aspect (1), the second data generation unit converts the first data of time series into the second data which is spectrogram including the first frequency component, the time component, and the amplitude component. The third data generation unit converts the second data into the third data including the first frequency component, the second frequency component, and the amplitude component. Then, the determination unit determines the state of the inspection object based on the third data.

That is, the third data is obtained by excluding the time component from the first data, and the determination unit determines the state of the inspection object using the data that does not include the time component. Accordingly, the inspection device can obtain the inspection result in which the influence due to the difference in the time component is eliminated when performing the inspection using the time series data.

The inspection learning model generation device according to the present invention includes: a first data storage unit configured to store time series first data according to a state of an inspection object; a second data generation unit configured to generate second data, which is spectrogram including a first frequency component, a time component, and an amplitude component by performing short-time Fourier transform on the first data; a third data generation unit configured to generate third data including the first frequency component, a second frequency component, and the amplitude component by performing Fourier transform on time-amplitude data for each first frequency component in the second data, respectively; and a learning model generation unit configured to generate a learning model which is used to determine the state of the inspection object and in which fourth data is used as output data when the third data is used as input data. According to the inspection learning model generation device, the same effect as that of the inspection device can be obtained.

DETAILED DESCRIPTION (1. Application Target of Inspection Device 100)

The inspection device 100 targets an inspection object that operates when predetermined operation is performed, and is configured to determine a state of the inspection object based on time series data obtained when the inspection object is operating. The inspection object is, for example, a component of an electric steering device, and the inspection device 100 can be used for an inspection of the component of the electric steering device. The state of the inspection object is, for example, a degree of vibration of the inspection object, and the inspection device 100 can inspect the inspection object by determining a degree of vibration. The time series data is, for example, waveform data indicating operation of an output signal from a sensor capable of detecting the state of the inspection object. The inspection device 100 can determine the state of the inspection object by analyzing the time series data.

In the present embodiment, the inspection object is a component of a column type electric steering device. The inspection device 100 determines whether the electric steering device is a non-defective product based on the degree of vibration generated from the component of the electric steering device that operates when predetermined operation is performed on the electric steering device. Specifically, the inspection device 100 sets the non-defective electric power steering device as a reference state electric steering device, and sets the time series data obtained from the non-defective electric steering device as reference time series data. Then, the inspection device 100 determines whether the electric steering device is a non-defective product based on a difference amount when the time series data obtained from the electric steering device is compared with the reference time series data.

In the present embodiment, an example in which the inspection device 100 is used to inspect whether the inspection object is a non-defective product is described as an example, but the present invention is not limited thereto. For example, the inspection device 100 may be used to inspect whether there is a specific defective factor. In this case, the inspection device 100 can identify a defective factor for the inspection object determined to be defective. The inspection object is not limited to a fixed component or a member, and a movable unit, a component to be deformed (for example, a motor or a speed reducer), or the like can be used as the inspection object.

(2. Configurations of Inspection Object and Inspection System 1)

First, the configuration of the inspection object and the configuration of the inspection system 1 including the inspection device 100 will be described with reference to FIG. 1. As described above, the inspection object is a component of column type electric steering device 50.

(2-1: Configuration of Electric Steering Device 50)

Figure 1:
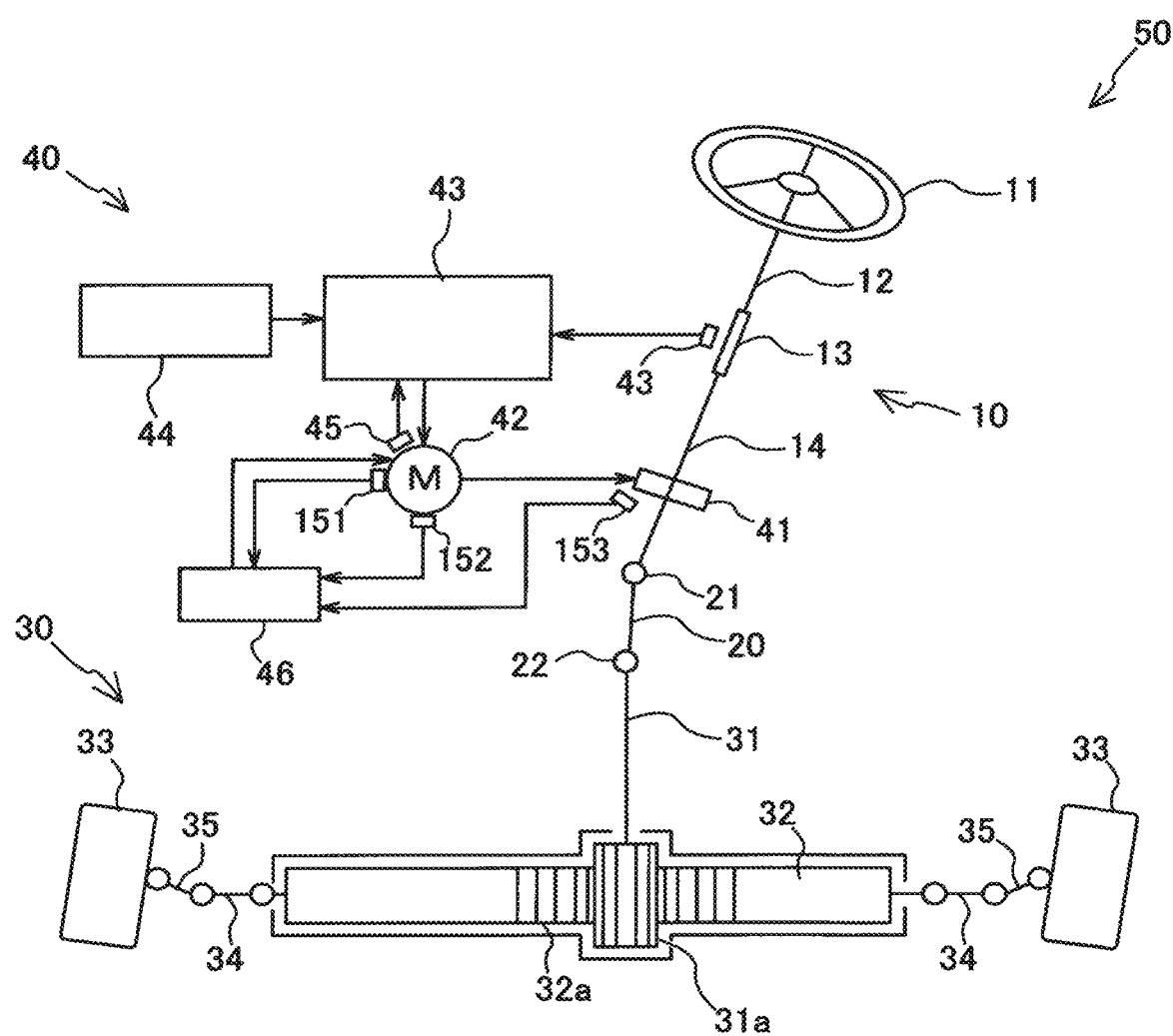
FIG. 1 illustrates a configuration of an inspection system.

As illustrated in FIG. 1, the electric steering device 50 which is the inspection object mainly includes a steering mechanism 10, an intermediate shaft 20, and a turning mechanism 30.

The steering mechanism 10 mainly includes a steering member 11, an input shaft 12, a torsion bar 13, an output shaft 14, and a steering assist mechanism 40. The steering member 11 is a handle operated by a driver. The input shaft 12 is a shaft member which connects the steering member 11 and the torsion bar 13. The input shaft 12 is configured to transmit rotation (steering) of the steering member 11 to the torsion bar 13. The torsion bar 13 connects the input shaft 12 and the output shaft 14 in a relatively rotatable manner. When relative rotation of the input shaft 12 and the output shaft 14 occurs, the torsion bar 13 is elastically deformed in a torsional direction. The output shaft 14 is a shaft member configured to output the rotation input from the steering member 11 via the input shaft 12 and the torsion bar 13 to the turning mechanism 30. The steering assist mechanism 40 is configured to assist the rotation of the output shaft 14 (assist the steering of the steering member 11). Details of the steering assist mechanism 40 will be described below.

The intermediate shaft 20 is configured to transmit the rotation between the steering mechanism 10 and the turning mechanism 30. One axial end side of the intermediate shaft 20 is connected to the output shaft 14 of the steering mechanism 10 via a universal joint 21, and the other axial end side of the intermediate shaft 20 is connected to a pinion shaft 31 of the turning mechanism 30 via a universal joint 22.

The turning mechanism 30 includes the pinion shaft 31, a turning shaft 32, and turned wheels 33. One axial end side of the pinion shaft 31 is connected to the output shaft 14 via the universal joint 22, and the other axial end side of the pinion shaft 31 is formed with a pinion 31a. The turning shaft 32 is formed with a rack 32a which meshes with the pinion 31a, and the turned wheels 33 are connected to both axial ends of the turning shaft 32 via a pair of tie rods 34 and a pair of knuckle arms 35. The turning mechanism 30 changes a turned angle of the turned wheels 33 by moving the turning shaft 32 in an axial direction (a vehicle width direction).

Here, a configuration of the steering assist mechanism 40 will be described. The steering assist mechanism 40 includes a speed reducer 41, an electric motor 42, a torque sensor 43, a vehicle speed sensor 44, a rotation angle sensor 45, and a control unit 46.

The speed reducer 41 is a worm speed reducer including a worm gear (not illustrated) and a worm wheel (not illustrated) which meshes with the worm gear. The worm gear is integrally and rotatably connected to a motor shaft of the electric motor 42, and the worm wheel is integrally and rotatably connected to the output shaft 14. The electric motor 42 is configured to rotationally drive the worm gear of the speed reducer 41. Rotation of the motor shaft of the electric motor 42 is transmitted to the turning mechanism 30 via the speed reducer 41, the output shaft 14, and the intermediate shaft 20, and is converted into a force for moving the turning shaft 32 in the axial direction in the turning mechanism 30.

The torque sensor 43 is configured to detect steering torque applied to the steering member 11 based on a torsion amount of the torsion bar 13. The vehicle speed sensor 44 is configured to detect a vehicle speed of a vehicle (not illustrated) on which the electric steering device 50 is mounted. The rotation angle sensor 45 is configured to detect a rotation angle of the motor shaft of the electric motor 42. The control unit 46 is configured to set a target value of steering assist torque applied to the speed reducer 41 by the electric motor 42, and to control a current supplied to the electric motor 42 such that actual steering assist torque becomes the target value based on output signals from the torque sensor 43, the vehicle speed sensor 44, and the rotation angle sensor 45.

(2-2: Configuration of Inspection System 1)

Next, the configuration of the inspection system 1 will be described. The inspection system 1 uses the electric motor 42 and the speed reducer 41, which are components of the electric steering device 50, as inspection objects. The inspection system 1 includes an inspection device 100 and a sensor. In the present embodiment, the inspection system 1 includes, as sensors, two vibration sensors 151, 152, and one sound sensor 153. Types and quantities of the sensors provided in the inspection system 1 in the present embodiment are examples, and can be changed as appropriate. That is, the inspection system 1 may include a sensor other than the vibration sensors and the sound sensor. In the inspection system 1, the number of the vibration sensors may be one or three or more, and the number of the sound sensors may be two or more.

The vibration sensors 151, 152 are three-axis acceleration sensors capable of detecting vibration of the electric motor 42, and the two vibration sensors 151, 152 are attached to the electric motor 42 at positions separated from each other. In the inspection system 1, the vibration sensor 151 is configured to detect acceleration (vibration) in three directions of the electric motor 42 that operates when the steering member 11 is rotated at a constant rotational speed, and to output an output signal corresponding to a degree of the acceleration to the inspection device 100. The sound sensor 153 is a microphone capable of detecting a sound generated from the speed reducer 41. The sound sensor 153 is provided in a vicinity of the speed reducer 41 and at a position where the sound generated from the speed reducer 41 can be detected. In the inspection system 1, the sound sensor 153 is configured to detect a sound caused by vibration of the speed reducer 41 that operates when the steering member 11 is rotated at the constant rotation speed, and to output an output signal corresponding to a degree of the sound to the inspection device 100.

The inspection device 100 is configured to analyze waveform data of seven patterns of the output signals obtained from the three sensors 151, 152, and 153, and to determine a state (a degree of vibration) of each of the electric motor 42 and the speed reducer 41 which are the inspection objects. The configuration of the inspection device 100 will be specifically described below.

(3. Schematic Configuration of Inspection Device 100)

Figure 2:
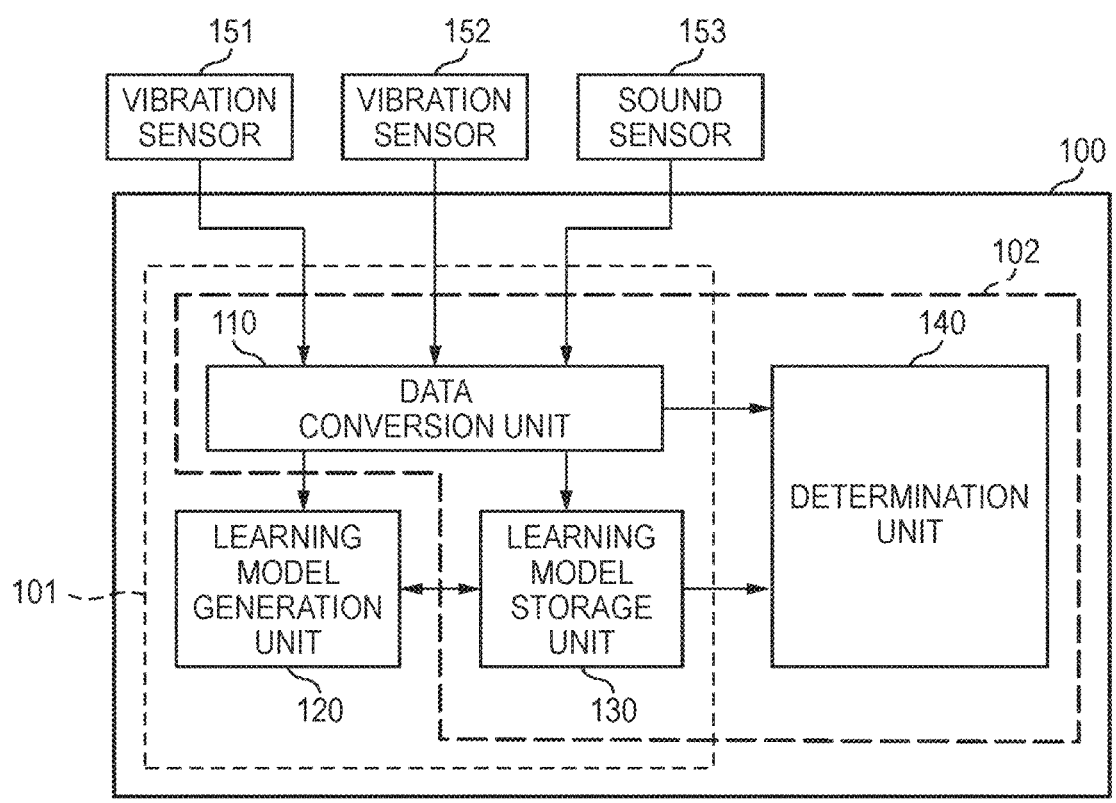
FIG. 2 is a schematic block diagram of an inspection device.

Next, the schematic configuration of the inspection device 100 will be described with reference to FIG. 2. As shown in FIG. 2, the inspection device 100 mainly includes a data conversion unit 110, a learning model generation unit 120, a learning model storage unit 130, and a determination unit 140. Among these, the data conversion unit 110, the learning model generation unit 120, and the learning model storage unit 130 function as a learning phase 101 of machine learning, and the data conversion unit 110, the learning model storage unit 130, and the determination unit 140 function as an inference phase 102 of the machine learning.

(3-1: Learning Phase 101)

The learning phase 101 is configured to generate a learning model M used to determine the state of the inspection object in the inference phase 102. The learning phase 101 corresponds to an inspection learning model generation device.

Figure 3:
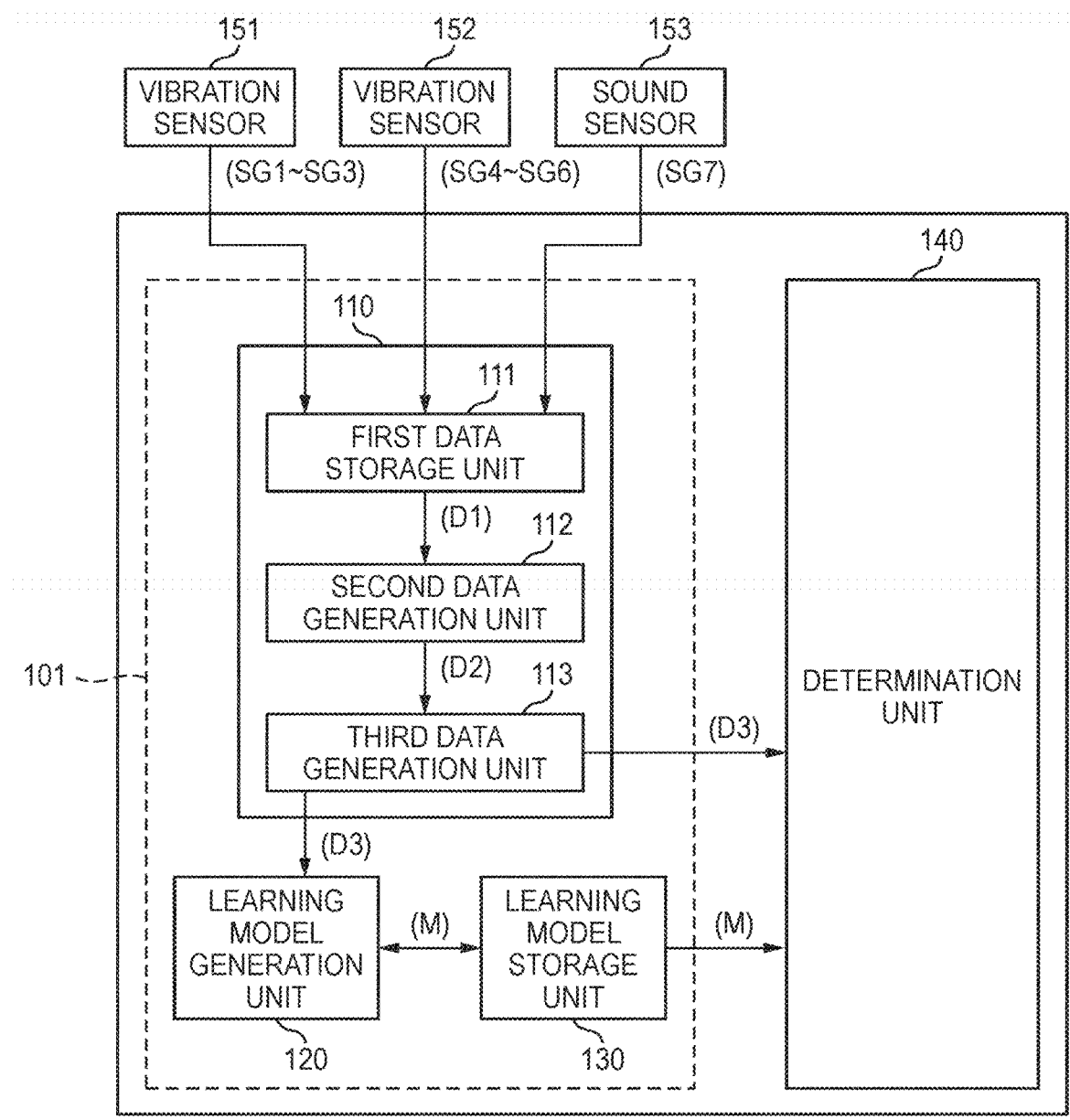
FIG. 3 is a block diagram showing a configuration which functions as a learning phase in the inspection device.

As shown in FIG. 3, the data conversion unit 110 includes a first data storage unit 111, a second data generation unit 112, and a third data generation unit 113. The first data storage unit 111 is configured to acquire the output signals from the vibration sensors 151, 152 and the sound sensor 153, and to store the waveform data of each output signal as time series first data D1. The second data generation unit 112 is configured to generate second data D2, which is spectrogram data including a first frequency component, a time component, and an amplitude component by performing short-time Fourier transform on the first data D1. The third data generation unit 113 is configured to generate third data D3 including the first frequency component, a second frequency component, and the amplitude component by performing Fourier transform on time-amplitude data for each first frequency component in the second data D2, respectively.

The learning model generation unit 120 is configured to generate a learning model M to be used in determining the state of the inspection object in the inference phase 102. The learning model storage unit 130 is configured to store the learning model M generated by the learning model generation unit 120. The determination unit 140 is configured to determine the state of the inspection object using the learning model M in the inference phase 102.

Figure 4:
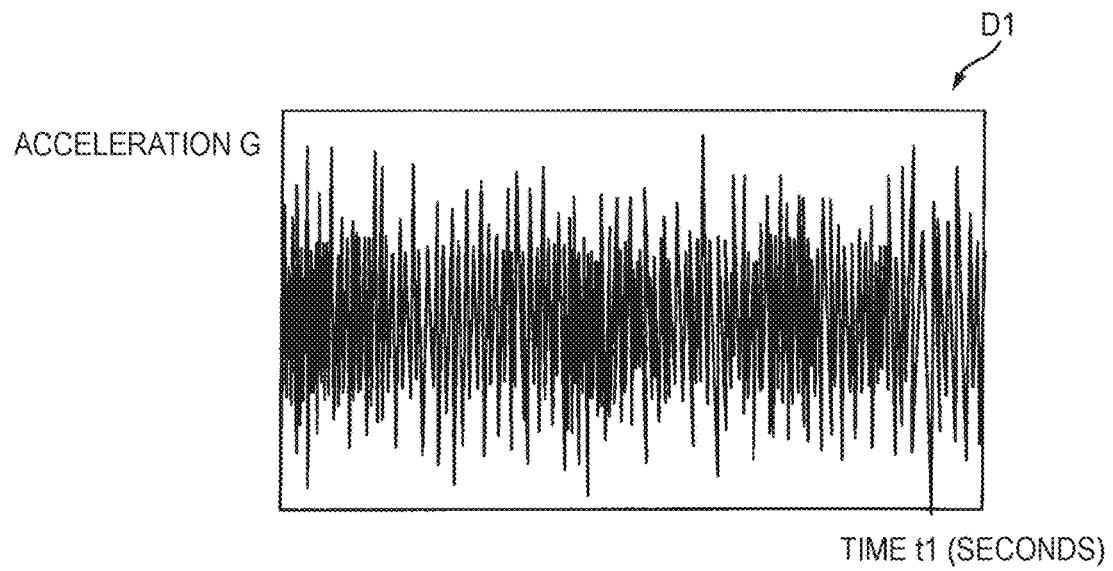
FIG. 4 is a diagram showing an example of waveform data which is first data of time series.

Next, the first data D1 will be described with reference to FIG. 4. In the present embodiment, the first data D1 is output signals of the vibration sensors 151, 152 and the sound sensor 153. FIG. 4 shows waveform data of one detection signal from the vibration sensor 151 as an example of the first data D1. In the first data D1 shown in FIG. 4, a horizontal axis indicates time t1, and a vertical axis indicates acceleration G which is an amplitude component. The vibration sensor 151 is capable of detecting vibration in each of three axes, and the first data storage unit 111 is configured to acquire and store three patterns of the first data D1 indicating the degree of vibration in each direction from the vibration sensor 151.

Next, the second data D2 will be described with reference to FIGS. 5 and 6. The second data D2 is obtained by converting the first data D1 into data including a first frequency component, a time component, and an amplitude component. As described above, the second data generation unit 112 generates the second data D2 by performing the short-time Fourier transform on the first data D1.

Figure 5:
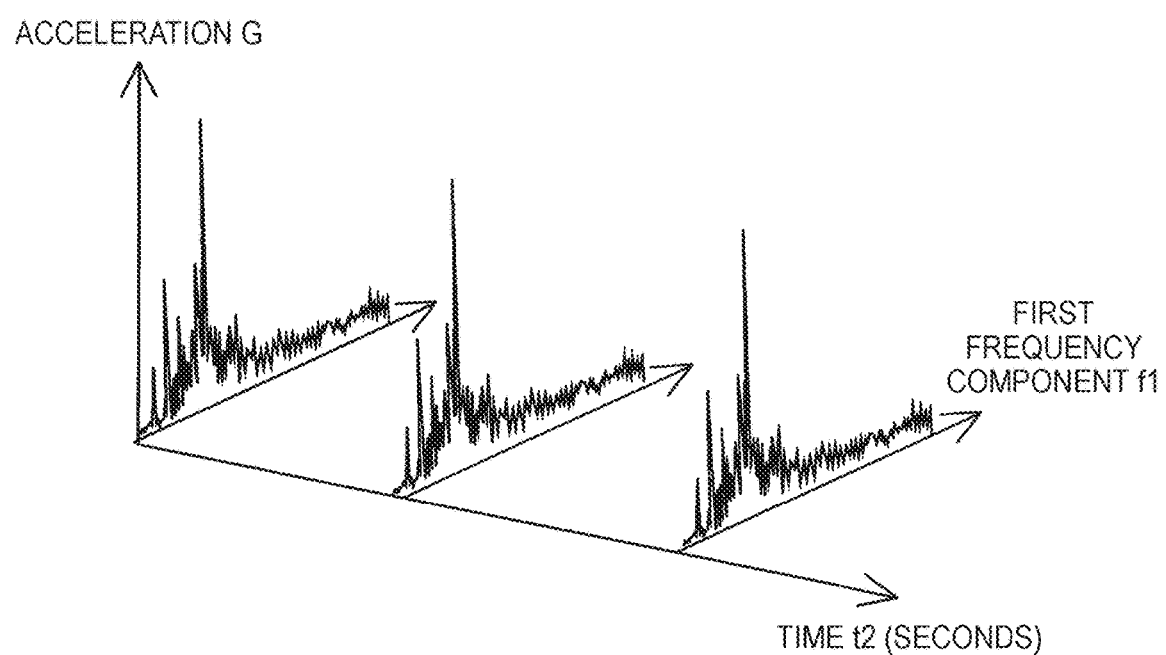
FIG. 5 is a diagram showing a process of generating second data by a second data generation unit.

Specifically, as shown in FIG. 5, the second data generation unit 112 extracts short-time waveform data (first waveform data) of a minute time (for example, 0.1 seconds) from the waveform data of the first data D1, and performs Fourier transform on the extracted first waveform data. The short-time waveform data is time series data including a time component and the amplitude component (the acceleration G), and becomes waveform data including a first frequency component and an amplitude component by being subjected to Fourier transform.

Subsequently, the second data generation unit 112 extracts short-time waveform data (second waveform data) of a minute time from the waveform data of the first data D1, and performs Fourier transform on the extracted second waveform data. The second waveform data is short-time waveform data obtained by shifting the time component by a predetermined time (for example, 0.05 seconds) with respect to the first waveform data. As described above, the second data generation unit 112 performs Fourier transform on each of pieces of all the waveform data extracted every minute time while shifting the time by the predetermined time from the waveform data of the first data D1.

Figure 6:
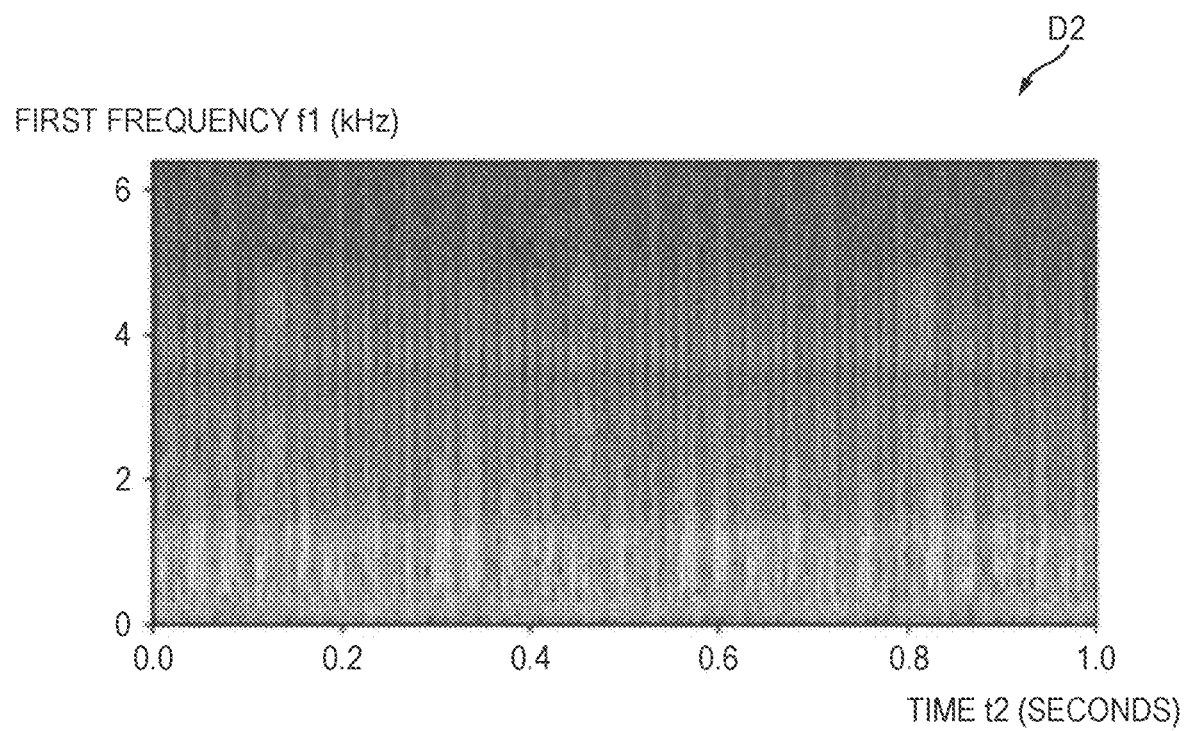
FIG. 6 is a diagram showing an example of spectrogram data which is the second data.

Then, as shown in FIG. 6, the second data generation unit 112 generates spectrogram data including the first frequency component, the time component, and the amplitude component (the acceleration G) based on a result of performing the Fourier transform on a plurality of pieces of the short-time waveform data. In the spectrogram data shown in FIG. 6, a horizontal axis indicates time t2, a vertical axis indicates the first frequency f1, and a color indicates the acceleration G which is the amplitude component.

Next, the third data D3 will be described with reference to FIGS. 7 to 9. The third data D3 is obtained by converting the second data D2 into data including the first frequency component, the second frequency component, and the amplitude component. The third data generation unit 113 is configured to generate the third data D3 by performing Fourier transform on time t2-amplitude data for each first frequency component in the second data D2, respectively.

Figure 7:
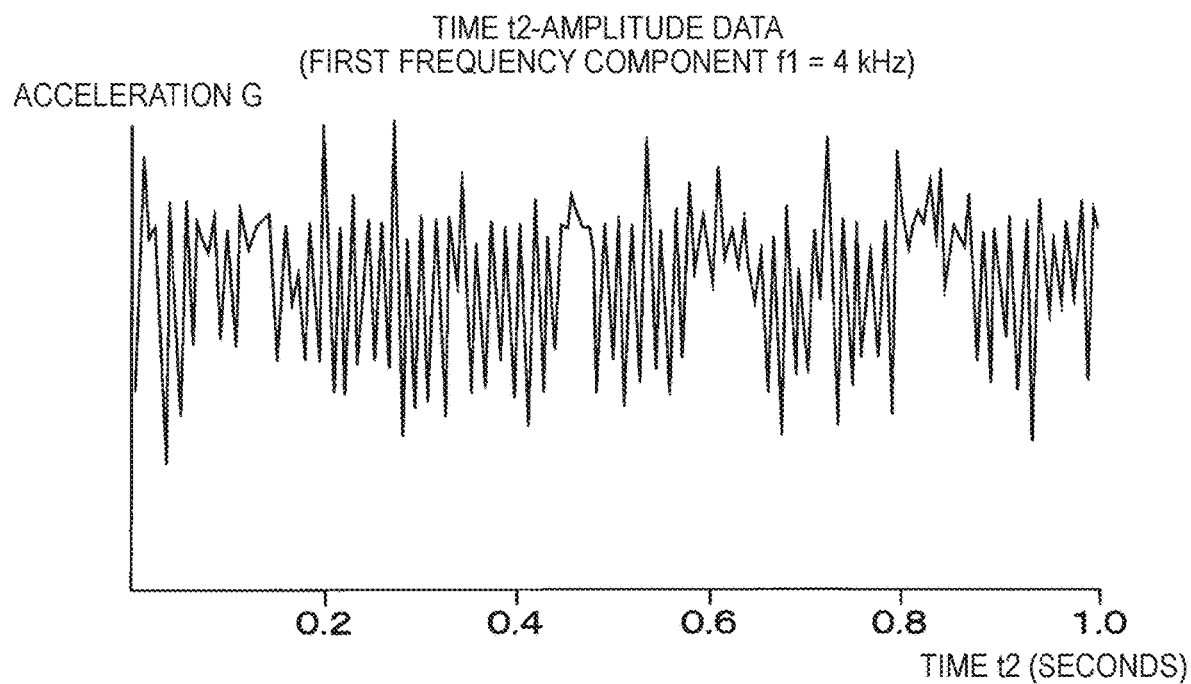
FIG. 7 is a diagram showing an example of time-amplitude data.

FIG. 7 shows an example of the time t2-amplitude data. Specifically, as shown in FIG. 7, operation of the amplitude component (the acceleration G) at which the first frequency f1 is 4 kHz is represented by the time series data. As described above, the second data D2 is data generated by superimposing the time t2-amplitude data for each first frequency component.

Figure 8:
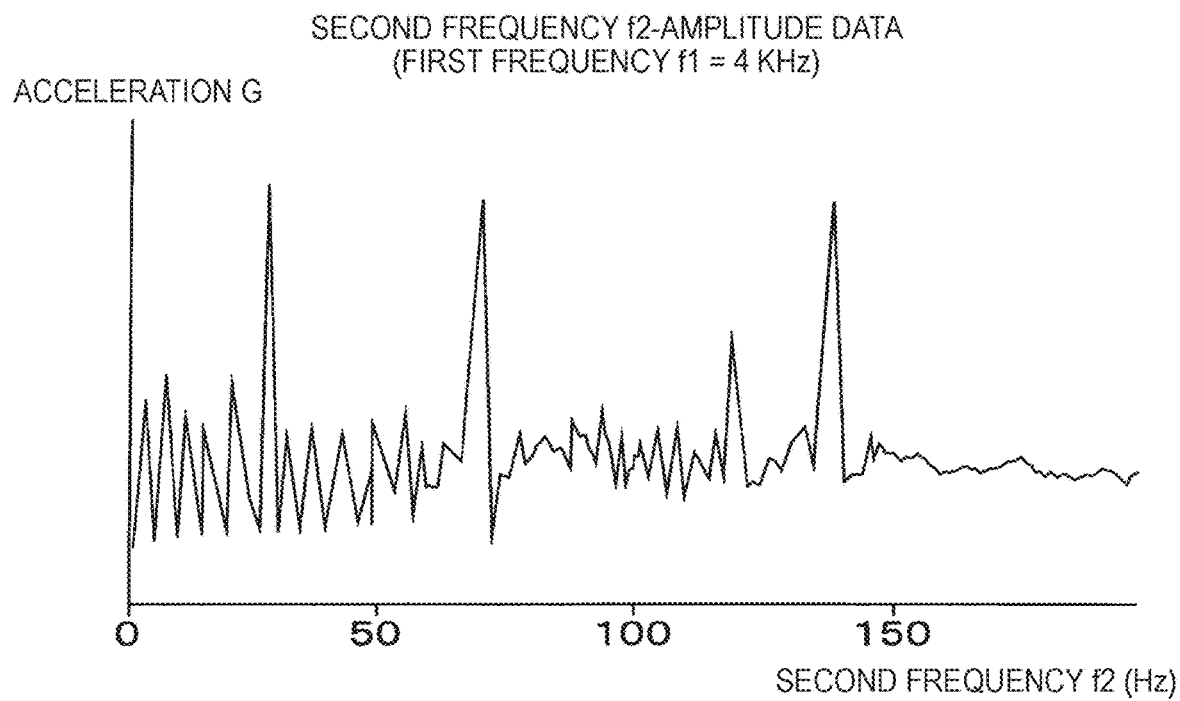
FIG. 8 is a diagram showing an example of second frequency component-amplitude data.

Then, as shown in FIG. 8, the third data generation unit 113 performs Fourier transform on the time t2-amplitude data for each first frequency component, and generates second frequency f2-amplitude data for each first frequency component. As shown in FIG. 8, the amplitude component (the acceleration G) at which the first frequency f1 is 4 kHz is represented for each second frequency component. As described above, the third data generation unit 113 performs Fourier transform on the time t2-amplitude data included in the second data D2 for each first frequency component, and converts the time t2-amplitude data into data not including a time component.

Figure 9:
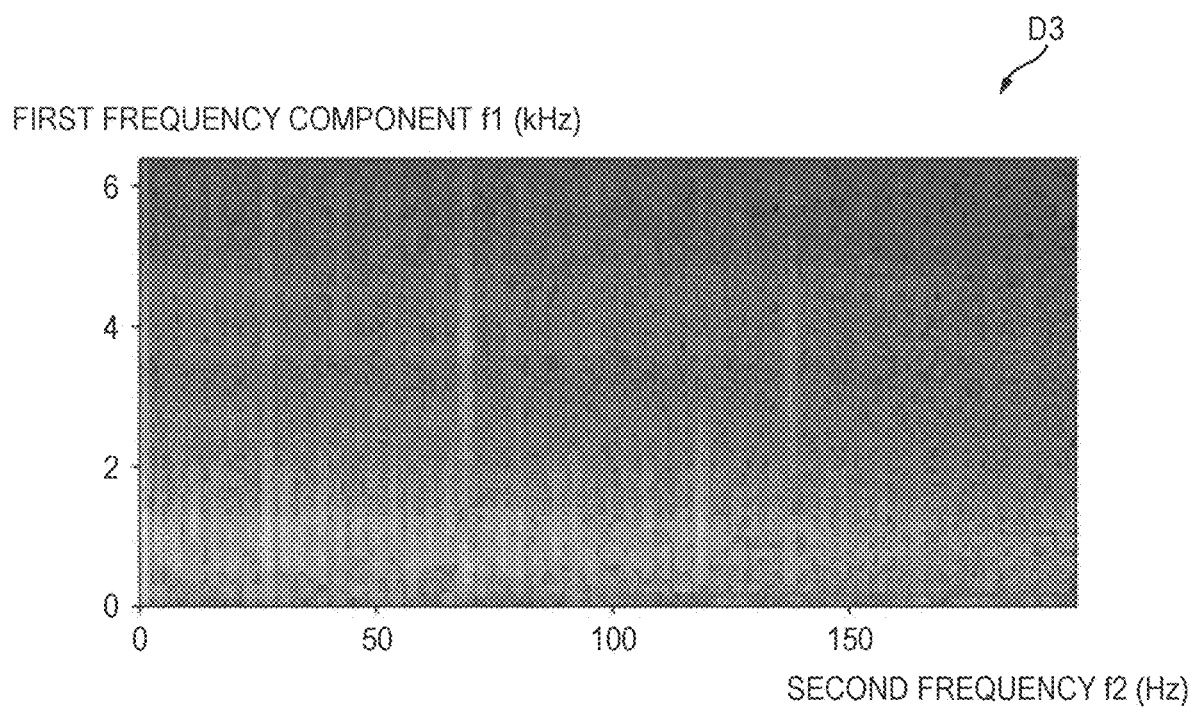
FIG. 9 is a diagram showing an example of image data which is third data.

Then, as shown in FIG. 9, the third data generation unit 113 generates image data including the first frequency component, the second frequency component, and the amplitude component based on a plurality of pieces of the second frequency f2-amplitude data. FIG. 9 shows the image data with a specification approximate to the spectrogram data. A horizontal axis indicates the second frequency f2, a vertical axis indicates the first frequency f1, and a color indicates the acceleration G which is the amplitude component. Accordingly, the third data generation unit 113 can convert the second data D2 which is the image data including the time component into the third data D3 which is image data not including the time component. Accordingly, the data conversion unit 110 converts the first data D1 which is the time series data into the third data D3 not including the time component.

Figure 10:
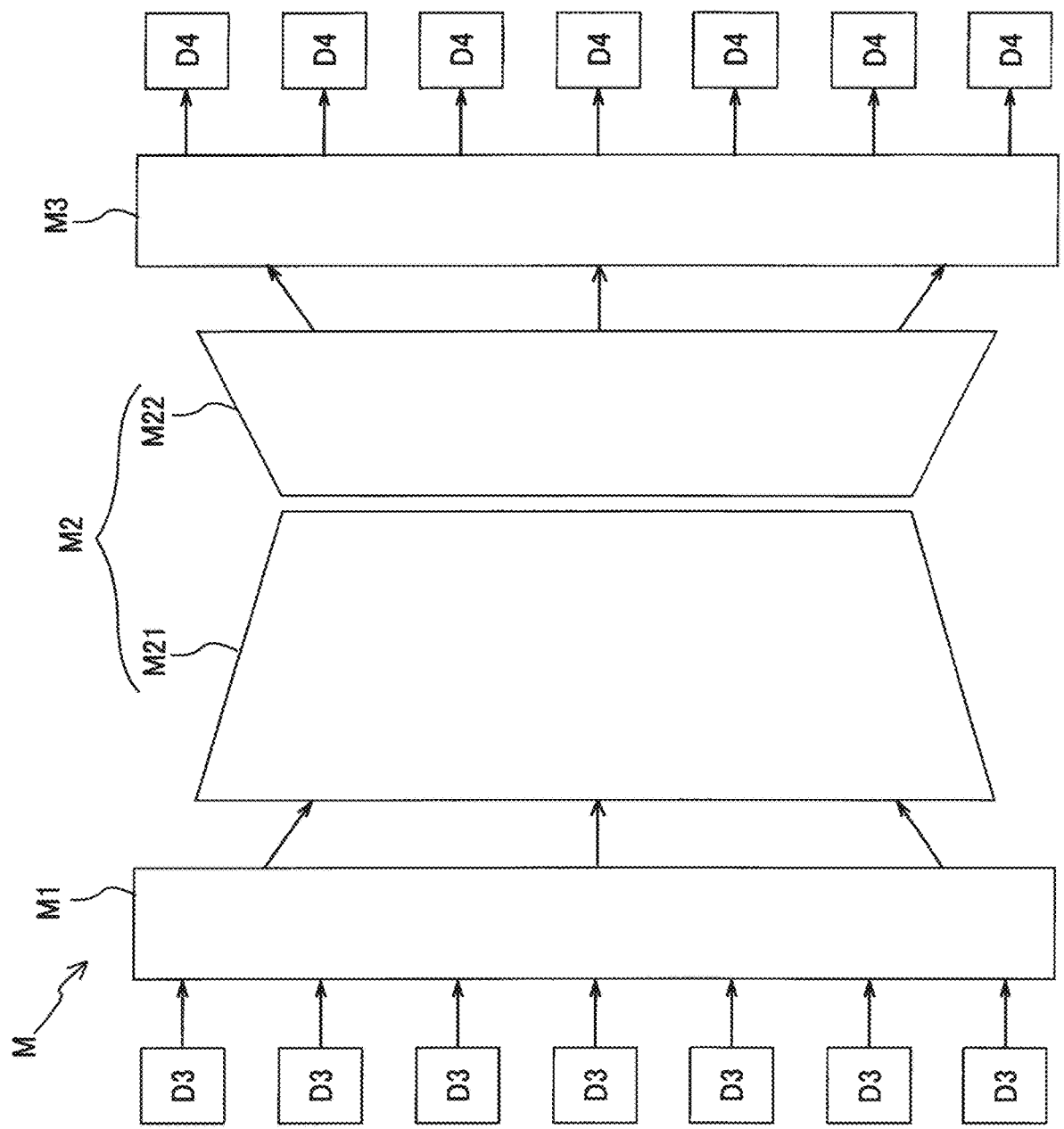
FIG. 10 is a diagram schematically showing a learning model.

Next, the learning model M will be described with reference to FIG. 10. As shown in FIG. 10, the learning model M is an automatic encoder including an input layer M1, an intermediate layer M2, and an output layer M3. The third data D3 is input to the input layer M1 as input data. The third data D3 is the image data. One piece of the third data D3 includes the same number of pieces of pixel data as the number of pixels, and each piece of pixel data is used as input data. The intermediate layer M2 includes a first intermediate layer M21 configured to compress a dimension of the input data and to extract a feature amount included in the input data, and a second intermediate layer M22 configured to expand the dimension of the compressed data and to set the dimension of the data to the same number as the dimension of the input data. The output layer M3 is configured to output fourth data D4 obtained by extracting a feature amount from the third data D3.

As described below, the determination unit 140 determines the state of the inspection object using the third data D3 input to the learning model M as input data and the fourth data D4 output from the learning model M. Then, the inspection device 100 can obtain a highly accurate inspection result in the inference phase 102 by generating the learning model M that extracts an appropriate feature amount in the learning phase 101.

In the present embodiment, the state of the inspection object to be inspected by the inspection device 100 is the degree of vibration of the electric motor 42 and the speed reducer 41 which are the components of the electric steering device 50. The inspection device 100 analyzes the vibration generated during operation of the electric motor 42 and the speed reducer 41, and determines whether the electric steering device 50 is a non-defective product.

In this regard, the inspection device 100 determines whether the inspection object is a non-defective product using the amplitude component and the frequency component included in the first data D1 and the second data D2. On the other hand, the time component included in the first data D1 and the second data D2 is not required for determining whether the inspection object is a non-defective product by the inspection device 100. That is, during the operation of the electric motor 42 and the speed reducer 41, a timing at which the vibration occurs does not affect a result of determining whether the electric steering device 50 is a non-defective product by the inspection device 100.

On the other hand, the first data D1 and the second data D2 include the time component. Accordingly, when the learning model generation unit 120 generates the learning model M using the first data D1 and the second data D2 as the input data, there is a high possibility that the time component is included in the feature amount extracted in the intermediate layer M2. However, as described above, the time component included in the first data D1 and the second data D2 does not affect a result of determining whether the inspection object is a non-defective product. Accordingly, even if whether the inspection object is a non-defective product is determined using the learning model M that extracts the feature amount including the time component, the inspection device 100 cannot obtain the highly accurate result of determining whether the inspection object is a non-defective product.

Therefore, in the data conversion unit 110, the inspection device 100 converts the first data including the time component and generates the third data D3 not including the time component. Then, the learning model generation unit 120 uses the generated third data D3 as the input data. Therefore, the learning model generation unit 120 can generate the learning model M that extracts the feature amount not including the time component in the intermediate layer M2. The fourth data D4 output from the learning model M is the image data obtained by extracting the feature amount included in the amplitude component and the frequency component (the first frequency component and the second frequency component) from the waveform data of the output signals of the vibration sensors 151, 152 and the sound sensor 153.

In the present embodiment, the inference phase 102 determines whether the inspection object is a non-defective product, whereas the learning phase 101 uses the third data D3 of the inspection object which is a non-defective product as the input data when the learning model M is generated. That is, in the learning phase 101, the data conversion unit 110 generates the non-defective third data D3 based on the first data D1 obtained from the inspection object which is a non-defective product, and the learning model generation unit 120 uses the non-defective third data D3 as the input data and learns a large amount of pieces of the third data D3. Accordingly, the learning model M can extract an appropriate feature amount from the third data D3 in the intermediate layer M2.

As a result, the learning model M outputs the fourth data D4, which is not different from the third data D3, as the output data when the third data D3 of the inspection object which is a non-defective product is input in the inference phase 102. On the other hand, the learning model M outputs fourth data D4, which is different from the third data D3, as output data when the third data D3 of the inspection object which is a defective product is input in the inference phase 102.

(3-2: Inference Phase 102)

Next, the configuration of the determination unit 140 that functions only in the inference phase 102 will be described. In the inference phase 102, the determination unit 140 determines the state of the inspection object using the learning model M generated in the learning phase 101.

Figure 11:
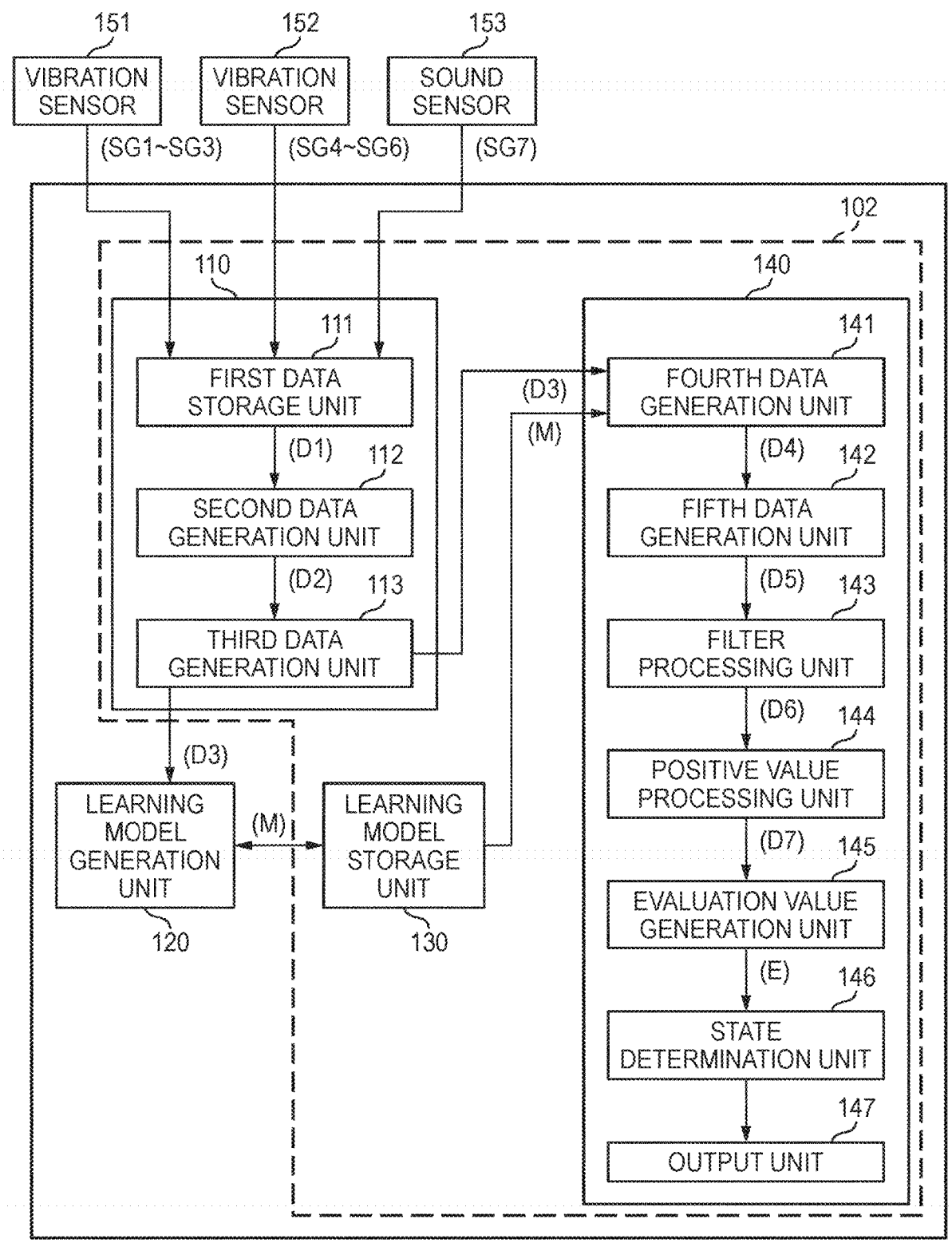
FIG. 11 is a block diagram showing a configuration which functions as an inference phase in the inspection device.

As shown in FIG. 11, the determination unit 140 includes a fourth data generation unit 141, a fifth data generation unit 142, a filter processing unit 143, a positive value processing unit 144, an evaluation value generation unit 145, a state determination unit 146, and an output unit 147.

The fourth data generation unit 141 generates the fourth data D4. Specifically, when there are output signals from the vibration sensors 151, 152 and the sound sensor 153 in the inference phase 102, the data conversion unit 110 generates the third data D3 based on the first data D1. Thereafter, the determination unit 140 acquires the third data D3 generated by the third data generation unit 113 and the learning model M stored in the learning model storage unit 130. Then, the fourth data generation unit 141 inputs the third data D3 generated by the data conversion unit 110 to the learning model M, and generates the fourth data D4.

The fifth data generation unit 142 is configured to generate fifth data D5 indicating a difference value obtained by calculating a difference between the third data D3 input to the learning model M and the fourth data D4 output from the learning model M by each coordinate of a two-dimensional coordinate system. Details of the fifth data D5 will be described below with reference to FIGS. 12 to 14.

The filter processing unit 143 is configured to generate sixth data D6 by performing processing using a low-pass filter on the fifth data D5. That is, the filter processing unit 143 performs processing using the low-pass filter for each of the first frequency f1 and the second frequency f2. A reason why the fifth data D5 is processed using the low-pass filter will be described below with reference to FIGS. 15A and 15B.

The positive value processing unit 144 is configured to generate seventh data D7 by performing positive value processing on the sixth data D6. In the positive value processing, all coordinate values included in the sixth data D6 are set to 0 or positive values. In the present embodiment, the positive value processing unit 144 set all the coordinate values included in the sixth data D6 to 0 or positive values by squaring all the coordinate values. However, the present invention is not limited thereto, and the positive value processing unit 144 may set all the coordinate values to 0 or positive values by, for example, converting all the coordinate values included in the sixth data D6 into absolute values.

The evaluation value generation unit 145 is configured to generate an evaluation value indicating a comparison result between the third data D3 and the fourth data D4 based on each coordinate value of the seventh data D7. In the present embodiment, the evaluation value generation unit 145 sets the seventh data D7 as target data to be used for comparison between the third data D3 and the fourth data D4, and obtains a sum of all the coordinate values of the seventh data D7. The evaluation value represents a difference amount between the third data D3 and the fourth data D4. The smaller the evaluation value is, the smaller the difference between the third data D3 and the fourth data D4 is, which indicates that the inspection object is a non-defective product.

The state determination unit 146 is configured to determine a difference between a state of the inspection object and a reference state based on the comparison result between the third data D3 and the fourth data D4. That is, the state determination unit 146 sets the third data D3 generated based on the new first data D1 as the reference state to determine the difference between the state of the fourth data D4 and the state of the third data D3 which is the reference state. As a result, the state determination unit 146 determines that the electric steering device 50 is a non-defective product when a difference amount between the degree of vibration that can be grasped from the third data D3 and the degree of vibration that can be grasped from the fourth data D4 is small.

Specifically, if the inspection object is a non-defective product, the fourth data generation unit 141 generates the fourth data D4 that is not different from the third data D3. Therefore, in this case, the state determination unit 146 determines that the inspection object is a non-defective product. On the other hand, if the inspection object is a defective product, the fourth data generation unit 141 generates the fourth data D4 that is different from the third data D3. As a result, if the difference between the third data D3 and the fourth data D4 is large, the state determination unit 146 determines that the inspection object is a defective product. Thus, the determination unit 140 can easily determine the inspection result for the inspection object.

When the evaluation value is a preset threshold value or less, the state determination unit 146 determines that the state of the inspection object is included within a predetermined range from the reference state. In the present embodiment, when the evaluation value generated by the evaluation value generation unit 145 is the preset threshold value or less, the state determination unit 146 determines that the electric steering device 50 which is the inspection object is a non-defective product. Accordingly, the determination unit 140 can easily determine the inspection result for the inspection object. Then, the output unit 147 is configured to output the determination result by the state determination unit 146 as the inspection result of the inspection device 100.

(4. Fifth Data D5)

Figure 12:
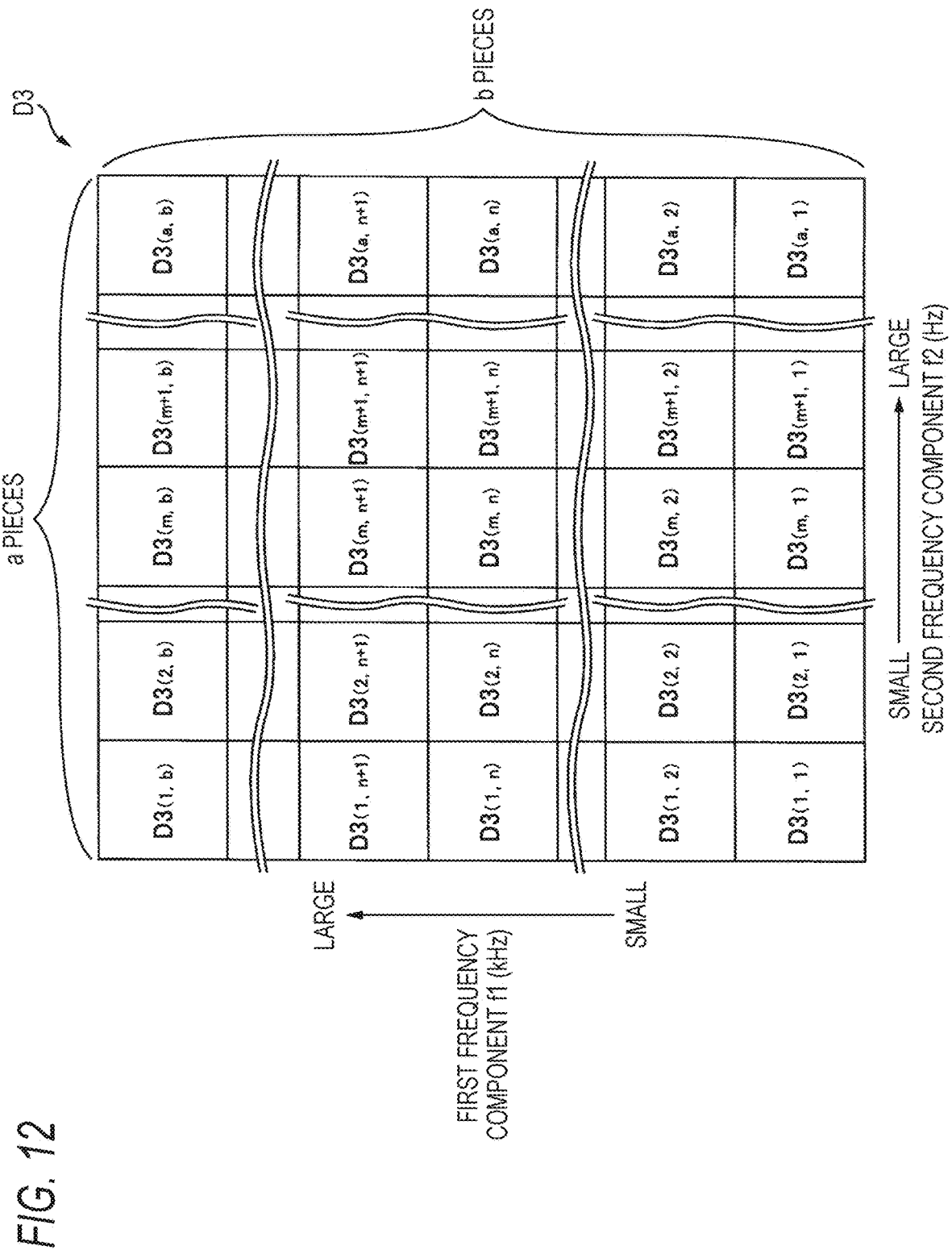
FIG. 12 is a diagram showing the third data in a two-dimensional coordinate system.

Here, as shown in FIG. 12, image data of the third data D3 includes (a×b) pieces of pixel data having a pieces of pixel data in a horizontal axis direction indicating magnitude of the second frequency f2 and b pieces of pixel data in a vertical axis direction indicating magnitude of the first frequency f1. In the third data D3, a value of the amplitude component of each piece of pixel data is represented by a color of a pixel, whereas in FIG. 12, the value of the amplitude component in the third data D3 is represented by a coordinate value in the two-dimensional coordinate system of the first frequency f1 and the second frequency f2. Among coordinates of the third data D3 represented in the two-dimensional coordinate system, the value of the amplitude component indicated by a coordinate located at an m-th counted from a left and an n-th counted from a bottom is denoted as D3 (m, n).

Figure 13:
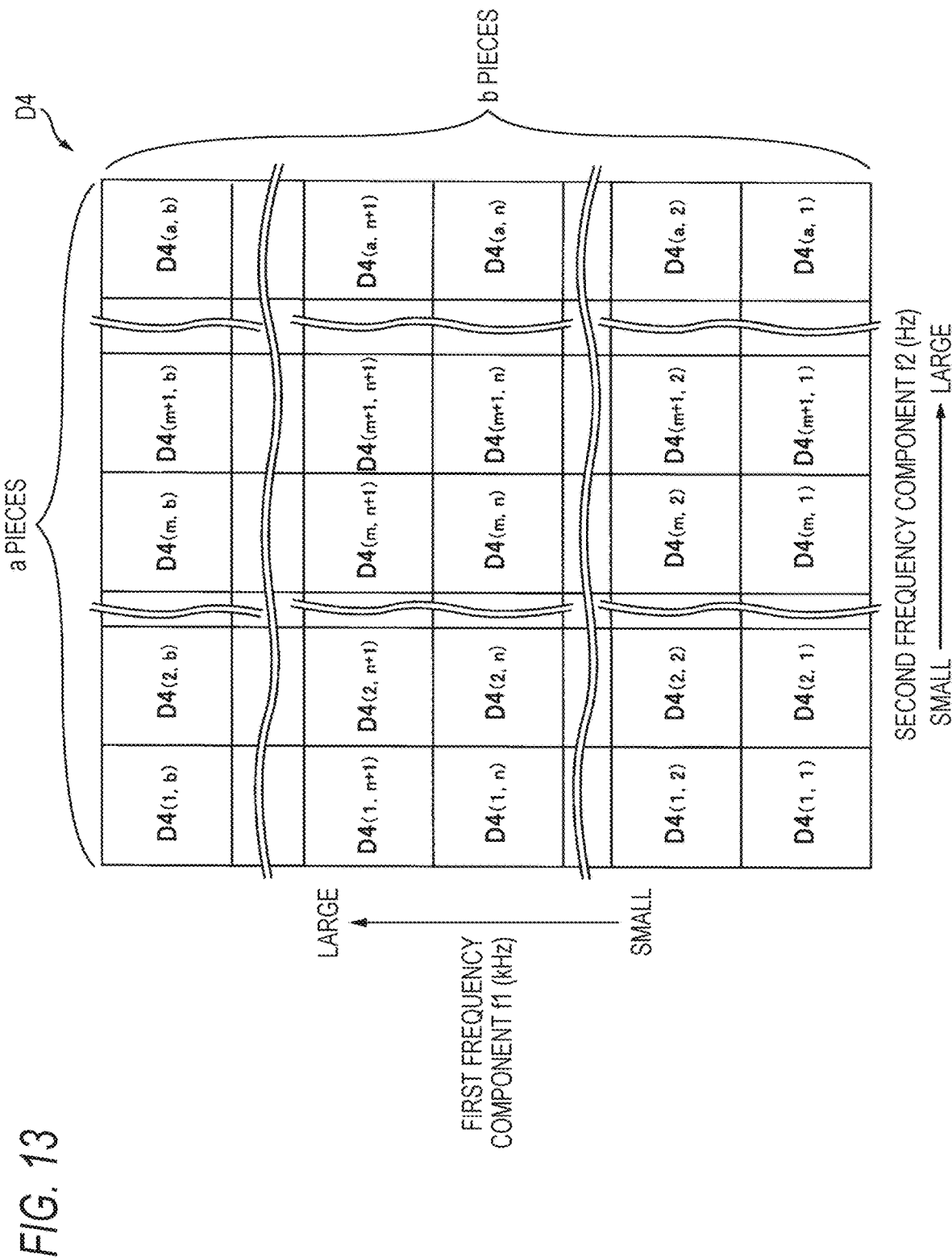
FIG. 13 is a diagram showing fourth data in the two-dimensional coordinate system.

As shown in FIG. 13, image data of the fourth data D4 includes the same number of pieces of pixel data as the third data D3. In FIG. 13, similarly to FIG. 12, the value of the amplitude component in the fourth data D4 is represented by a coordinate value in the two-dimensional coordinate system of the first frequency component and the second frequency component.

Among coordinates of the fourth data D4 represented in the two-dimensional coordinate system, the value of the amplitude component indicated by a coordinate located at an m-th counted from a left and an n-th counted from a bottom is denoted as D4 (m, n).

Figure 14:
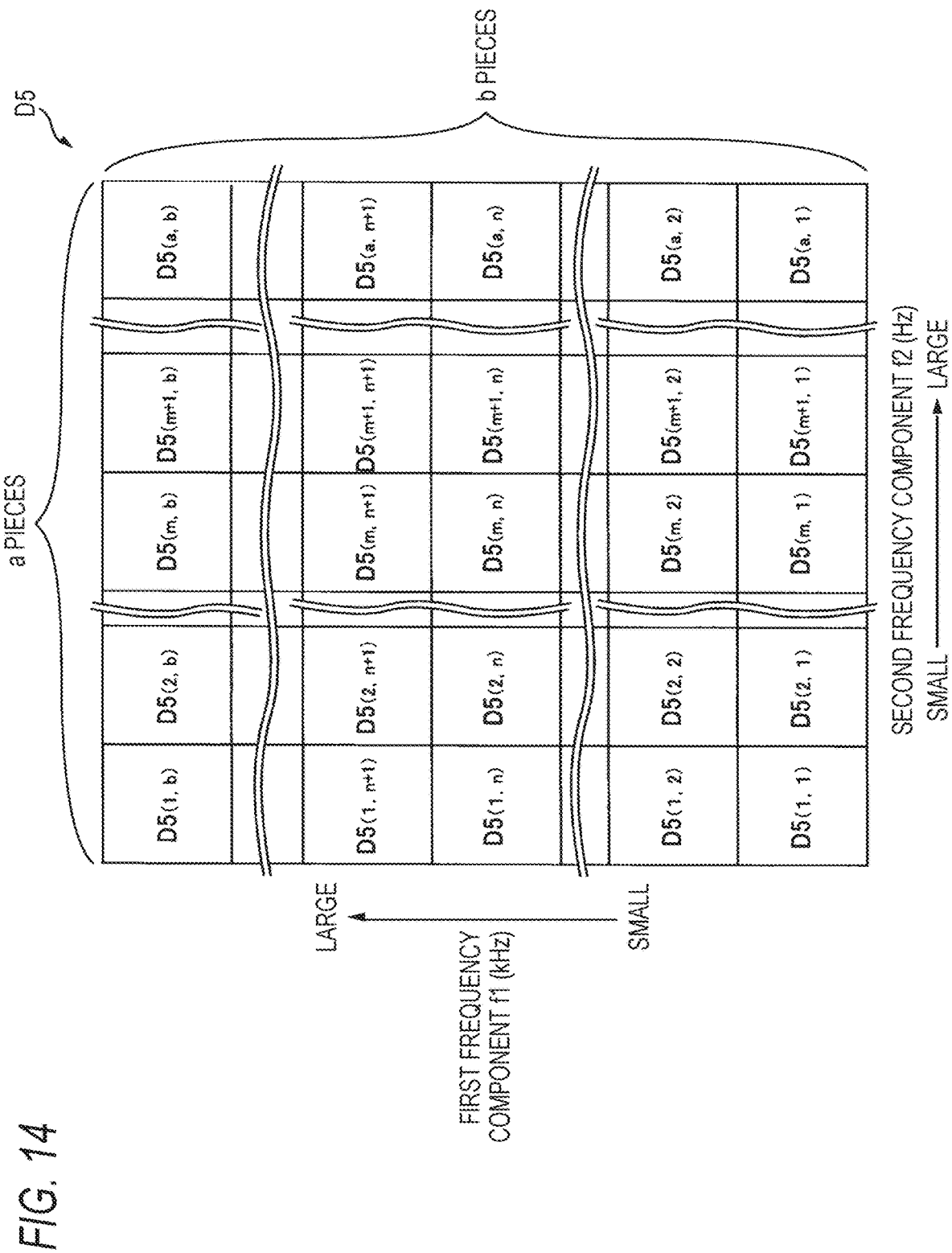
FIG. 14 is a diagram showing fifth data in the two-dimensional coordinate system.

As shown in FIG. 14, the fifth data D5 is two-dimensional coordinate system data similar to the third data D3 and the fourth data D4 represented in the two-dimensional coordinate system. The coordinate value of the fifth data D5 is a difference value of the corresponding coordinate values of the third data D3 and the fourth data D4 represented in the two-dimensional coordinate system. Among coordinates of the fifth data D5 represented in the two-dimensional coordinate system, the difference value of the amplitude component indicated by a coordinate located at an m-th counted from a left and an n-th counted from a bottom is denoted as D5 (m, n).

D5 (m, n) is a value obtained by subtracting D4 (m, n) from D3 (m, n), so that if there is no difference in amplitude component between D3 (m, n) and D4 (m, n), D5 (m, n) is zero. On the other hand, if there is a difference in amplitude component between D3 (m, n) and D4 (m, n), D5 (m, n) is a positive value or a negative value.

(5. Filter Processing Unit 143)

Next, a reason why the fifth data D5 is processed using the low-pass filter will be described with reference to FIGS. 15A and 15B. Here, a case is taken as an example where, in the third data D3, the second frequency f2 at which the value of the amplitude component increases is x1, and in the fourth data D4, the second frequency f2 at which the value of the amplitude component increases is x2, which is slightly larger than x1. Among coordinates of the sixth data D6 represented in the two-dimensional coordinate system, the difference value of the amplitude component indicated by a coordinate located at an m-th counted from a left and an n-th counted from a bottom is denoted as D6 (m, n).

Figure 15A:
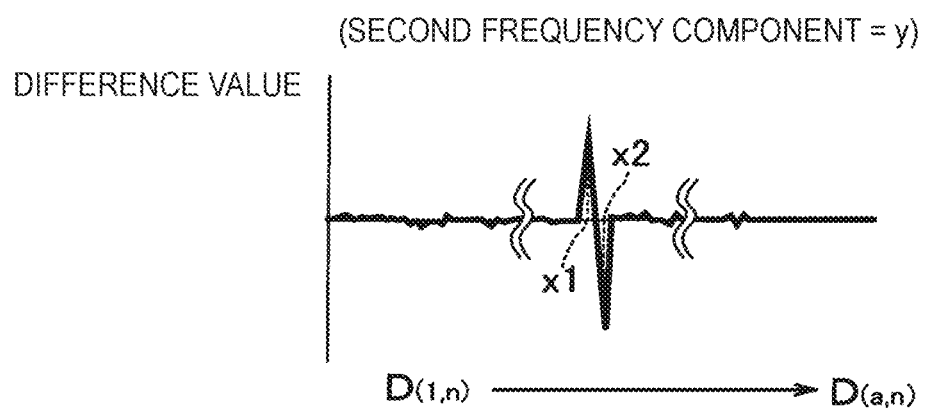
FIG. 15A shows, for each second frequency, an amplitude component whose first frequency component is a specific value in the fifth data.
Figure 15B:
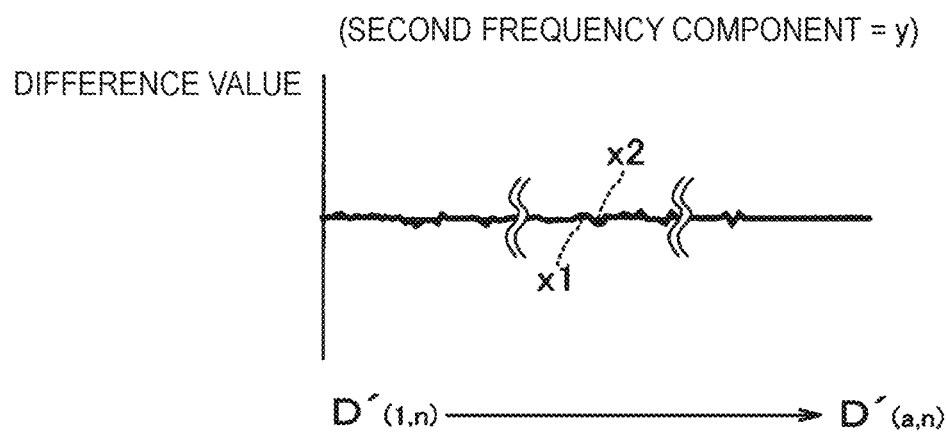
FIG. 15B shows, for each second frequency, an amplitude component whose first frequency component is a specific value in sixth data.

FIG. 15A shows an example of the fifth data D5, and shows, for each second frequency component, a difference in the difference value in which the first frequency f1 is a specific value y. In the example shown in FIG. 15A, when the second frequency f2 is x1, the difference value (D5 (x1, y)=D3 (x1, y)−D4 (x1, y)) of the amplitude component is extremely large. On the other hand, when the second frequency f2 is x2, the difference value (D5 (x2, y)=D3 (x2, y)−D4 (x2, y)) of the amplitude component is extremely small.

In fact, if the difference in the second frequency f2 is within an error range, the difference does not affect the state determination (the determination whether the inspection object is a non-defective product) of the inspection object. However, in the fifth data D5, when the difference in the second frequency f2 is within the error range, D5 (x1, y) and D5 (x2, y) can be extreme values. Accordingly, an evaluation value generated by squaring each value of D5 (x1, y) and D5 (x2, y) directly in the positive value processing unit 144 and calculating a sum of the coordinate values after the positive value processing in the evaluation value generation unit 145 may be extremely large. That is, the state determination unit 146 is more likely to determine that the evaluation value is larger than a threshold value. As a result, the difference in the second frequency f2 does not actually affect the determination whether the inspection object is a non-defective product. The inspection device 100 is more likely to determine that the inspection object is a defective product even if the inspection object should be determined to be a non-defective product.

On the other hand, in the determination unit 140, the filter processing unit 143 performs processing using a low-pass filter on the fifth data D5. In this case, when the coordinate value is an extreme value in the fifth data D5, the determination unit 140 can reduce an influence of the coordinate value on the determination result by the state determination unit 146. As a result, when the difference between the first frequency f1 and the second frequency f2 is an error that does not affect the state determination (the determination whether the inspection object is a non-defective product) of the inspection object, the inspection device 100 can avoid determining that the inspection object is a defective product based on the error.

As described above, in the inspection device 100, the second data generation unit 112 converts the first data D1 of time series into the second data D2 which is spectrogram data including the first frequency component, the time component, and the amplitude component. The third data generation unit 113 converts the second data D2 into the third data D3 including the first frequency component, the second frequency component, and the amplitude component. Then, the determination unit 140 determines the state of the inspection object based on the third data D3. That is, the third data D3 is obtained by excluding the time component from the first data D1, and the determination unit 140 determines the state of the inspection object using the data that does not include the time component. Accordingly, the inspection device 100 can obtain the inspection result in which the influence due to the difference in the time component is eliminated when performing the inspection using the time series data, and as a result, the inspection result with high accuracy can be obtained. The inspection device 100 can obtain a highly accurate inspection result by using the automatic encoder as the learning model M.

The inspection device 100 uses the output signals of the vibration sensors 151, 152 and the sound sensor 153 as the first data D1. Therefore, the inspection system 1 can obtain a highly accurate inspection result by performing the inspection by the inspection device 100 while using a sensor used in a related art.

In the inference phase 102, when the evaluation value is the threshold value or less, the state determination unit 146 determines that the inspection object is a non-defective product. That is, even if the inspection object includes defective elements, the state determination unit 146 determines that the inspection object is a non-defective product if the number of the included defective elements is small. On the other hand, in the learning phase 101, the third data D3 to be input by the learning model generation unit 120 is preferably generated based on the first data D1 obtained from the inspection object not including the defective elements. In this case, the inspection device 100 can prevent the state determination unit 146 from erroneously determining that the inspection object that is actually a defective product is a non-defective product.

DESCRIPTION OF REFERENCE NUMERALS AND SIGNS

1 inspection system
41 speed reducer (example of inspection object)
42 electric motor (example of inspection object)
50 electric steering device (example of inspection object)
100 inspection device
101 learning phase
102 inference phase
110 data conversion unit
111 first data storage unit
112 second data generation unit
113 third data generation unit
120 learning model generation unit
130 learning model storage unit
140 determination unit
141 fourth data generation unit
142 fifth data generation unit
143 filter processing unit
144 positive value processing unit
145 evaluation value generation unit
146 state determination unit
151, 152 vibration sensor
153 sound sensor
D1 first data
D2 second data
D3 third data
D4 fourth data
D5 fifth data
D6 sixth data
D7 seventh data
f1 first frequency component
f2 second frequency component
M learning model
M1 input layer
M3 output layer

What is claimed is:

1. An inspection device comprising:
a first data storage unit configured to store a first data which is time series according to a state of an inspection object;
a second data generation unit configured to generate second data, which is a spectrogram including a first frequency component, a time component, and an amplitude component by performing short-time Fourier transform on the first data;
a third data generation unit configured to generate third data including the first frequency component, a second frequency component, and the amplitude component by performing Fourier transform on time-amplitude data for each first frequency component in the second data, respectively; and
a determination unit configured to determine the state of the inspection object based on the third data,
wherein the third data does not include the time component.

2. The inspection device according to claim 1, further comprising:
a learning model storage unit configured to store a learning model when the third data of a reference generated based on the first data of a reference according to a reference state of the inspection object is used as an input layer and an output layer, the learning model being an automatic encoder in which fourth data is used as output data when the third data is used as input data,
wherein the determination unit includes:
a fourth data generation unit configured to generate the fourth data by the learning model by inputting the third data generated based on new first data according to the state of the inspection object to the learning model; and
a state determination unit configured to determine a difference between the state of the inspection object and the reference state based on a comparison result between the third data and the fourth data.

3. The inspection device according to claim 2,
wherein the determination unit further includes:
a fifth data generation unit configured to generate fifth data indicating, in each coordinate of a two-dimensional coordinate system of the first frequency component and the second frequency component, a difference value obtained by calculating a difference between a value of the amplitude component of each coordinate of the third data and a value of the amplitude component of each coordinate of the fourth data in the two-dimensional coordinate system; and
an evaluation value generation unit configured to generate an evaluation value based on a value of each coordinate of the fifth data, and
wherein when the evaluation value is a preset threshold value or less, the state determination unit determines that the state of the inspection object is included within a predetermined range from the reference state.

4. The inspection device according to claim 3,
wherein the determination unit further includes a filter processing unit configured to generate sixth data by performing processing using a low-pass filter on the fifth data, and
wherein the evaluation value generation unit generates the evaluation value based on a value of each coordinate of the sixth data.

5. The inspection device according to claim 4,
wherein the determination unit further includes a positive value processing unit configured to generate seventh data by performing positive value processing on the sixth data, and
wherein the evaluation value generation unit generates the evaluation value based on a value of each coordinate of the seventh data.

6. The inspection device according to claim 3, wherein the evaluation value generation unit is a sum of coordinate values of target data.

7. The inspection device according to claim 2, wherein a value of an amplitude component in the fourth data is represented by a coordinate value in a two-dimensional coordinate system of the first frequency component and the second frequency component.

8. The inspection device according to claim 1, wherein the inspection object is a component of an electric steering device.

9. The inspection device according to claim 1, wherein the state of the inspection object is a degree of vibration of the inspection object when the inspection object is operating.

10. The inspection device according to claim 1, wherein the first data is an output signal of a vibration sensor capable of detecting vibration of the inspection object or an output signal of a sound sensor capable of detecting a sound generated due to vibration of the inspection object.

11. The inspection device according to claim 1, wherein the second data is image data.

12. The inspection device according to claim 11, wherein the third data is image data.

13. The inspection device according to claim 1, wherein the third data is image data.

14. The inspection device according to claim 1, wherein a value of the amplitude component in the third data is represented by a coordinate value in a two-dimensional coordinate system of the first frequency component and the second frequency component.

15. An inspection learning model generation device comprising:
- a first data storage unit configured to store a first data which is time series according to a state of an inspection object;
- a second data generation unit configured to generate second data, which is spectrogram including a first frequency component, a time component, and an amplitude component by performing short-time Fourier transform on the first data;
- a third data generation unit configured to generate third data including the first frequency component, a second frequency component, and the amplitude component by performing Fourier transform on time-amplitude data for each first frequency component in the second data, respectively; and
- a learning model generation unit configured to generate a learning model which is used to determine the state of the inspection object and in which fourth data is used as output data when the third data is used as input data, wherein the third data does not include the time component.

16. The inspection learning model generation device according to claim 15, wherein the learning model is an automatic encoder in which the third data of a reference generated based on the first data of a reference according to a reference state of the inspection object is used as an input layer and an output layer.

* * * * *